United States Patent
Noh et al.

(10) Patent No.: US 10,018,864 B2
(45) Date of Patent: Jul. 10, 2018

(54) LIQUID CRYSTAL DISPLAY DEVICE COMPRISING A COMMON ELECTRODE HAVING FIRST AND SECOND OPENINGS AND METHOD OF MANUFACTURING THE SAME

(71) Applicant: SAMSUNG DISPLAY CO., LTD., Yongin-si, Gyeonggi-do (KR)

(72) Inventors: Jung Hun Noh, Yongin-si (KR); Keun Kyu Song, Seoul (KR); Hyun Sup Lee, Hwaseong-si (KR); Sang Hee Jang, Bucheon-si (KR); Byung Seok Choi, Seoul (KR)

(73) Assignee: SAMSUNG DISPLAY, CO., LTD. (KR)

( * ) Notice: Subject to any disclaimer, the term of this patent is extended or adjusted under 35 U.S.C. 154(b) by 2 days.

(21) Appl. No.: 15/199,745

(22) Filed: Jun. 30, 2016

(65) Prior Publication Data

US 2017/0003556 A1    Jan. 5, 2017

(30) Foreign Application Priority Data

Jul. 3, 2015  (KR) .......................... 10-2015-0095055

(51) Int. Cl.
*G02F 1/1333*  (2006.01)
*G02F 1/1339*  (2006.01)

(52) U.S. Cl.
CPC .... *G02F 1/133345* (2013.01); *G02F 1/13394* (2013.01); *G02F 2001/133357* (2013.01)

(58) Field of Classification Search
CPC ........ G02F 2001/133397; G02F 2001/133357; G02F 1/133516
See application file for complete search history.

(56) References Cited

U.S. PATENT DOCUMENTS

| | | | |
|---|---|---|---|
| 6,633,361 B1* | 10/2003 | Fujita | G02F 1/13452 349/149 |
| 7,834,354 B2 | 11/2010 | Lin et al. | |
| 8,330,920 B2 | 12/2012 | Han et al. | |
| 8,669,130 B2 | 3/2014 | Nam et al. | |
| 8,710,509 B2 | 4/2014 | Nagano | |
| 2009/0073149 A1* | 3/2009 | Matsumoto | H01L 29/78696 345/206 |
| 2012/0068944 A1* | 3/2012 | Oh | G02F 1/13338 345/173 |
| 2012/0182490 A1* | 7/2012 | Kim | G02F 1/134363 349/43 |
| 2013/0126876 A1* | 5/2013 | Shin | H01L 29/6675 257/59 |
| 2013/0162938 A1 | 6/2013 | Zhou | |
| 2014/0168591 A1* | 6/2014 | Park | G02F 1/13452 349/138 |

* cited by examiner

*Primary Examiner* — Paul Lee
(74) *Attorney, Agent, or Firm* — Innovation Counsel, LLP (57) ABSTRACT

A liquid crystal display device is provided. A liquid crystal display device, comprising: a first substrate and a second substrate facing each other; a liquid crystal layer disposed between the first substrate and the second substrate; a semiconductor layer disposed on the first substrate and including a channel area upon which a source electrode and a drain electrode are spaced apart from each other while facing each other; an organic layer disposed on the channel and including an opening that exposes at least a part of the channel area; and a common electrode disposed on the organic layer and including a first opening that extends across the channel area.

18 Claims, 11 Drawing Sheets

LIQUID CRYSTAL DISPLAY DEVICE COMPRISING A COMMON ELECTRODE HAVING FIRST AND SECOND OPENINGS AND METHOD OF MANUFACTURING THE SAME

This application claims priority to Korean Patent Application No. 10-2015-0095055 filed on Jul. 3, 2015 in the Korean Intellectual Property Office, the disclosure of which is incorporated herein by reference in its entirety.

BACKGROUND

1. Field of the Invention

Embodiments of the present invention relate generally to flat panel displays. More specifically, embodiments of the present invention relate to a liquid crystal display device and a method of manufacturing the same.

2. Description of the Related Art

A liquid crystal display device is a display device for displaying an image using electro-optical properties of liquid crystals, in which light transmittance varies depending on the intensity of an electric field. The liquid crystal display device includes a plurality of pixels defined by gate lines and data lines, which are arranged to intersect each other. Each pixel includes a pixel electrode and a color filter. The pixel electrode is driven by a thin film transistor.

The liquid crystal display device includes a first substrate and a second substrate facing each other. The thin film transistor and the pixel electrode are formed on the first substrate. When the thin film transistor is turned-on, a channel is formed and a data signal is transmitted to the pixel electrode. An organic layer is formed on the thin film transistor so as to achieve planarization. The organic layer includes an opening so that the data signal is transmitted to the pixel electrode.

Research into increasing the resolution of liquid crystal display devices is ongoing. As the resolution of the liquid crystal display device increases, the size of pixels is decreased. When the size of pixels is decreased in this way, the interval between data lines may gradually decrease. Thus, the opening in the organic layer is also required to be small. However, the organic layer includes a photosensitive material and may be patterned without an additional photoresist (PR). As such, taking into consideration the case where the patterning resolution of the organic layer is not sufficient, lower limitations are imposed on the size of the opening. The opening of the organic layer may expose the area that overlaps the channel. As the organic layer does not cover the area that overlaps the channel, when the common electrode is disposed on a channel without the organic layer, defects such as flicker or decoloring may occur, undesirably deteriorating display properties.

SUMMARY

Aspects of the present invention provide a liquid crystal display device and a method of manufacturing the same, in which high resolution of the liquid crystal display device may be realized without deterioration of display properties due to defects such as flicker or decoloring.

However, aspects of the present invention are not restricted to the ones set forth herein. The above and other aspects of the present invention will become more apparent to one of ordinary skill in the art to which the present invention pertains by referencing the detailed description of the present invention given below.

According to an aspect of the present invention, there is provided a liquid crystal display device, comprising: a first substrate and a second substrate facing each other; a liquid crystal layer disposed between the first substrate and the second substrate; a semiconductor layer disposed on the first substrate and including a channel area upon which a source electrode and a drain electrode are spaced apart from each other while facing each other; an organic layer disposed on the channel and including an opening that exposes at least a part of the channel area; and a common electrode disposed on the organic layer and including a first opening that extends across the channel area.

The opening of the organic layer can include a boundary that crosses the channel area.

The common electrode may further include a second opening that exposes at least a part of the drain electrode.

The liquid crystal display device may further comprise: a gate line and a data line disposed on the first substrate and arranged to intersect each other so as to define a pixel area, wherein the first opening and the second opening of the common electrode are spaced apart from each other along a direction of extension of the gate line.

The organic layer may be disposed on the gate line, and the opening of the organic layer may extend over at least a part of the gate line.

The first opening of the common electrode may extend over the entire drain electrode.

The liquid crystal display may further comprising: a gate line and a data line disposed on the first substrate and arranged to intersect each other to define a pixel area, wherein the first opening of the common electrode is oriented substantially parallel to the gate line.

The organic layer may be disposed on the gate line, and the opening of the organic layer may extend over at least a part of the gate line.

The liquid crystal display may further comprise: a first passivation layer disposed on the semiconductor layer and a second passivation layer disposed on the common electrode, wherein the first passivation layer and the second passivation layer collectively include a contact hole that exposes at least a part of the drain electrode.

The liquid crystal display may further comprise: a light-blocking member disposed on the second passivation layer, wherein a part of the light-blocking member is disposed in the opening of the organic layer.

According to another aspect of the present invention, there is provided a method of manufacturing a liquid crystal display device, the method comprising: forming a semiconductor layer on a first substrate, the semiconductor layer including a channel area upon which a source electrode and a drain electrode are spaced apart from each other while facing each other; forming an organic layer on the channel, the organic layer including an opening that exposes at least a part of the channel area; and forming a common electrode on the organic layer, the common electrode including a first opening that extends across the channel area.

The opening of the organic layer includes a boundary that crosses the channel area.

The common electrode further includes a second opening that exposes at least a part of the drain electrode.

The method may further comprise: forming a gate line and a data line on the first substrate, the gate line and the data line being arranged to intersect each other so as to define a pixel area, wherein the first opening and the second opening of the common electrode are spaced apart from each other along a direction of extension of the gate line.

The first opening of the common electrode may extend over the entire drain electrode.

The method may further comprise: forming a gate line and a data line on the first substrate, the gate line and the data line being arranged to intersect each other to define a pixel area, wherein the first opening of the common electrode is oriented substantially parallel to the gate line.

The method may further include: forming a first passivation layer between the semiconductor layer and the organic layer; forming a second passivation layer on the common electrode; and forming a contact hole in the first passivation layer and the second passivation layer, the contact hole exposing at least a part of the drain electrode.

The forming a contact hole may be performed by one photolithography process.

The method may further comprise: forming a color filter between the first passivation layer and the organic layer.

The method may further comprise: forming a light-blocking member on the second passivation layer, wherein a part of the light-blocking member is formed in the opening of the organic layer.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

The description that one element is connected to or coupled to another element includes both a case where the one element is directly connected to another element and a case where another element is interposed between the elements. However, the description that one element is directly connected or directly coupled to another element indicates that there is no further element between the elements. The term "and/or" includes any and all combinations of one or more of the associated listed items.

A singular expression in the present specification also includes a plural expression. The terms "comprise" and/or "comprising" do not exclude the possibility of existence or addition of one or more other components, steps, operations, and/or devices.

Hereinafter, preferred embodiments of the present invention will be described in detail with reference to the attached drawings. The various Figures are not necessarily to scale. All numerical values are approximate, and may vary. All examples of specific materials and compositions are to be taken as nonlimiting and exemplary only. Other suitable materials and compositions may be used instead.

Figure 1:
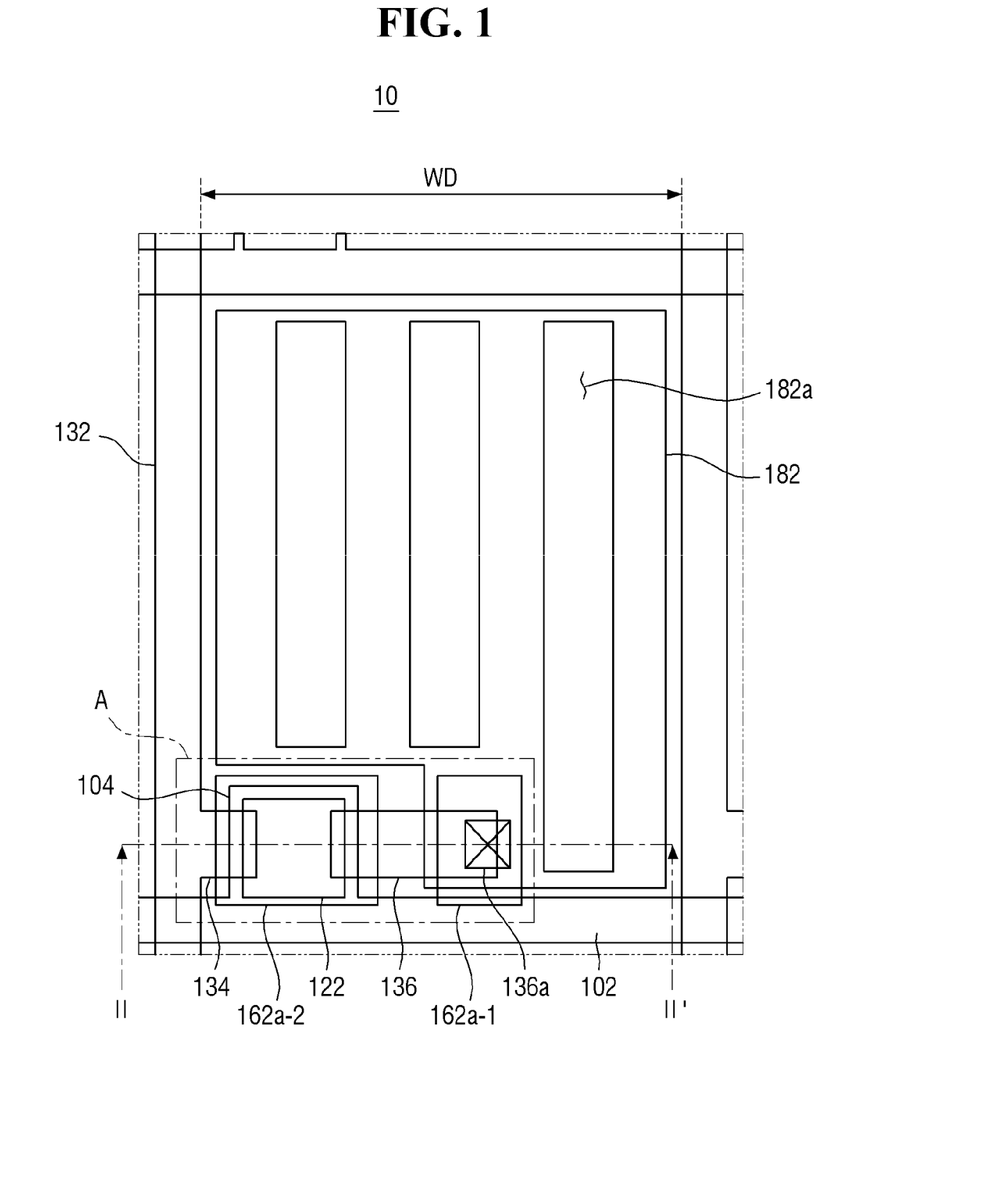
FIG. 1 is a layout view of a liquid crystal display device according to an embodiment of the present invention.
Figure 2:
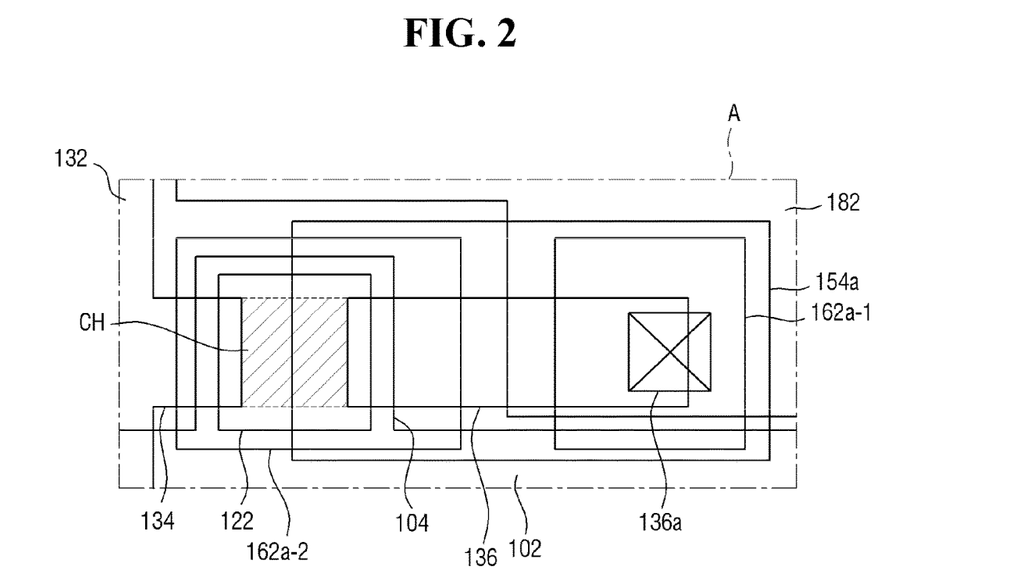
FIG. 2 is an enlarged view of Region A of FIG. 1.
Figure 3:
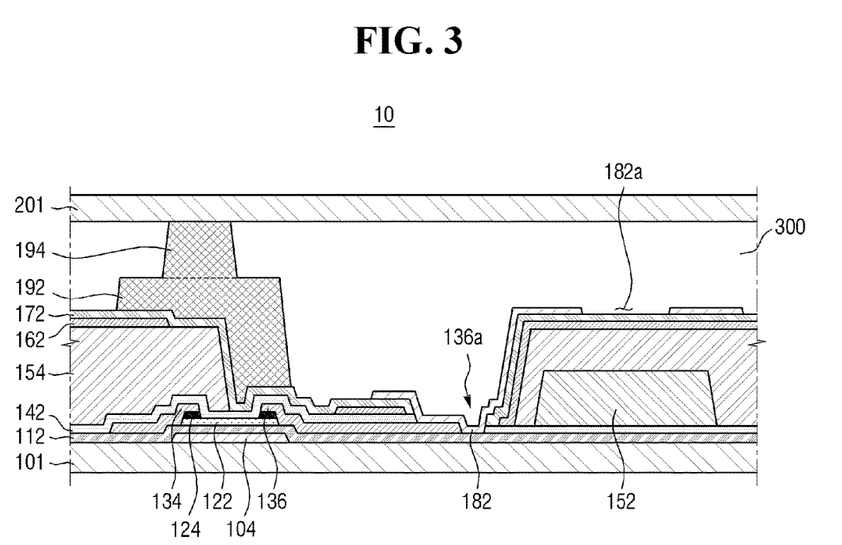
FIG. 3 is a cross-sectional view taken along the line II-II' of FIG. 1.

FIG. 1 is a layout view of a liquid crystal display device according to an embodiment of the present invention. FIG. 2 is an enlarged view of Region A of FIG. 1. Specifically, FIG. 2 illustrates the configuration between an organic layer 154 and a common electrode 162. FIG. 3 is a cross-sectional view taken along the line III-III' of FIG. 1.

Referring to FIGS. 1 to 3, the liquid crystal display device 10 according to an embodiment of the present invention includes a first substrate 101 and a second substrate 201 facing each other, and a liquid crystal layer 300 interposed between the first substrate 101 and the second substrate 201.

The first substrate 101 and the second substrate 201 may contain an insulating material, such as transparent glass, quartz, ceramics, silicon, or transparent plastics, which may be appropriately selected as desired by those skilled in the art. The first substrate 101 and the second substrate 201 may be disposed to face each other.

On the first substrate 101, a plurality of gate wirings (102, 104) and a plurality of data wirings (132, 134, 136) may be disposed.

The gate wirings (102, 104) may include a plurality of gate lines 102, and a plurality of gate electrodes 104. The data wirings (132, 134, 136) may include a plurality of data lines 132, a plurality of source electrodes 134, and a plurality of drain electrodes 136.

The gate wirings (102, 104) and the data wirings (132, 134, 136) may be formed of an aluminum (Al)-based metal such as Al and Al alloys, a silver (Ag)-based metal such as Ag and Al alloys, a copper (Cu)-based metal such as Cu and Cu alloys, a molybdenum (Mo)-based metal such as Mo and Mo alloys, chromium (Cr), titanium (Ti), and tantalum (Ta). Also, the gate wirings (102, 104) and the data wirings (132, 134, 136) may have a multilayer structure including two conductive layers (not shown) having different physical properties. For example, one conductive layer may be formed of an Al-based metal, an Ag-based metal, or a Cu-based metal, and the other conductive layer may be formed of a Mo-based metal, Cr, Ti, or Ta. Examples of such a combination may include a Cr lower layer and Al upper layer, and an Al lower layer and a Mo upper layer. However, the present invention is not limited thereto, and the gate wirings (102, 104) and the data wirings (132, 134, 136) may be formed of various metals and conductors in any combinations.

Individual gate lines 102 may extend along the boundaries of pixels in a first direction, for example, a transverse direction, and individual data lines 132 may extend along the boundaries of pixels in a second direction, for example, a longitudinal direction. The gate lines 102 and the data lines 132 are arranged perpendicular to each other in this embodiment, to intersect each other and thereby define pixel areas. Briefly, the pixel areas may be defined by the gate lines 102 and the data lines 132.

Each gate line 102 is connected to at least one gate electrode 104 per pixel. The gate electrode 104 may be formed by branching from the gate line 102 to a semiconductor layer 122, or by expanding the gate line 102. However, the present invention is not limited thereto, and the gate electrode 104 may be defined on the area that overlaps the semiconductor layer 122 on the extension path of the gate line 102.

Each data line 132 is connected to at least one source electrode 134 per pixel. The source electrode 134 may be formed by branching from the data line 132 to the semiconductor layer 122, or by expanding the data line 132. However, the present invention is not limited thereto, and the source electrode 134 may be defined on the area that overlaps the semiconductor layer 122 on the extension path of the data line 132. The drain electrode 136 may be spaced apart from the source electrode 134 over the semiconductor layer 122, and may be electrically connected to a pixel electrode 182 via a contact hole 136a formed through a first passivation layer 142 and a second passivation layer 172.

A gate insulating film 112 may be disposed between the gate wirings (102, 104) and the data wirings (132, 134, 136). In an embodiment, the gate insulating film 112 may be disposed on the gate wirings (102, 104), and the data wirings (132, 134, 136) may be disposed on the gate insulating film 112. The gate insulating film 112 may be formed of, for example, silicon nitride ($SiN_x$), silicon oxide ($SiO_2$), silicon oxynitride (SiON), or laminates thereof. The gate insulating film 112 may play a role in maintaining insulation from conductive thin films for the gate wirings (102, 104) and the data lines 132 positioned thereon.

The semiconductor layer 122 is disposed on the gate insulating film 112, and may be formed of, for example, hydrogenated amorphous silicon or polycrystalline silicon. The semiconductor layer 122 is disposed so as to at least partially overlap the gate electrode 104. The semiconductor layer 122 may constitute a thin film transistor, together with the gate electrode 104, the source electrode 134, and the drain electrode 136.

The semiconductor layer 122 may have various shapes, including an island shape, a linear shape, etc., and FIG. 3 illustrates an island-shaped semiconductor layer 122, but the present invention is not limited thereto. When the semiconductor layer 122 has a linear shape, the semiconductor layer 122 may overlap the data wirings (132, 134, 136) although this is not shown.

A resistive contact layer 124 comprising n+ hydrogenated amorphous silicon doped with an n-type dopant at high concentration may be disposed on the semiconductor layer 122. The resistive contact layer 124 is interposed between the lower semiconductor layer 122, and the upper source electrode 134 and drain electrode 136, to decrease contact resistance. The resistive contact layer 124 may have various shapes, including an island shape, a linear shape, etc., like the semiconductor layer 122. When the semiconductor layer 122 has an island shape, the resistive contact layer 124 may also be island-shaped, and when the semiconductor layer 122 has a linear shape, the resistive contact layer 124 may have a linear shape. The resistive contact layer 124 may be configured to expos the underlying semiconductor layer 122. The semiconductor layer 122 may include a channel CH formed in the area where the source electrode 134 and the drain electrode 136 are spaced apart from each other while facing each other.

When the gate electrode 104 receives a gate-on signal and a channel is formed at the channel CH of the semiconductor layer 122, the thin film transistor is turned-on, and the drain electrode 136 may transmit a data signal to the pixel electrode 182 from the source electrode 134.

In some embodiments, the channel CH may have a rectangular shape when viewed from above as shown in FIG. 2, but such a shape is merely illustrative, and may be of any other shape depending on factors such as the shape and configuration of the source electrode and the drain electrode.

The first passivation layer 142 may be disposed on the data wirings (132, 134, 136) and the exposed semiconductor layer 122. A contact hole 136a may be formed in the first passivation layer 142 and the second passivation layer 172, as will be described later, in order to expose at least a part of the drain electrode 136. At least the part of the drain electrode 136, exposed through the contact hole 136a, may come into contact with the pixel electrode 182. Thereby, the drain electrode 136 and the pixel electrode 182 may be electrically connected/coupled to each other.

As illustrated in FIGS. 1 and 2, the contact hole 136a may be configured to expose a part of the drain electrode 136 and a part of the gate insulating film 112, although this is merely illustrative, and the contact hole 136a may instead be configured such that a part of the drain electrode 136 is exposed and the gate insulating film 112 is not exposed.

The first passivation layer 142 may include, for example, an inorganic material such as silicon nitride or silicon oxide, and a material such as a-Si:C:O or a-Si:O:F formed by plasma-enhanced chemical vapor deposition (PECVD).

The organic layer 154 may be disposed on the first passivation layer 142. The organic layer 154 may be formed of a material having superior planarization properties and photosensitivity. The organic layer 154 includes an opening 154a for exposing at least a part of the drain electrode 136. Also, at least a part of the channel CH may be exposed by the opening 154a. Specifically, at least a part of the first passivation layer 142 that overlaps the channel CH may be exposed by the opening 154a. One side of the opening 154a may intersect the area where the source electrode 134 and the drain electrode 136 are spaced apart from each other while facing each other, as illustrated in FIG. 2, but the present invention is not limited thereto.

As the resolution of the liquid crystal display device increases, the interval WD between adjacent data lines 132 (i.e. pixel pitch) may gradually decrease. For example, the interval between the data lines may be about 16.93 um at a resolution of 500 PPI; about 14.11 um at a resolution of 600 PPI; and about 12.09 um at a resolution of 700 PPI. When the resolution of the liquid crystal display device increases in this way, the interval WD between the data lines may gradually decrease, and thus the opening 154a of the organic layer 154 is made smaller. However, the organic layer 154 includes a photosensitive material and may be patterned without an additional photoresist (PR). As such, taking into consideration the case where the patterning resolution of the organic layer 154 is not sufficient, limitations are imposed on continuously reducing the opening 154a. Furthermore, since the organic layer 154 is relatively thick compared to the passivation layers 142, 172, the width thereof is difficult to decrease. Hence, in an embodiment of the present invention, the opening 154a of the organic layer 154 is not excessively reduced, but is expanded until at least a part of the first passivation layer 142 overlapping the channel CH is exposed.

In some embodiments, the opening 154a of the organic layer 154 may expose the part of the first passivation layer 142 that overlaps the channel CH as shown in FIG. 2, although this is merely illustrative, and the opening 154a of the organic layer 154 may instead completely expose the first passivation layer 142 that overlaps the channel CH.

Furthermore, the opening 154a of the organic layer 154 may expose at least a part of the first passivation layer 142 that overlaps the gate line 102. One side (boundary) of the opening 154*a* may be disposed on the gate line 102, although this is merely illustrative, and the boundary of the opening 154*a* may instead not be disposed on the gate line 102. For example, the boundary of the opening 154*a* on the gate line 102 shown in FIG. 2 may be configured such that the position thereof is shifted downward or upward in the drawing.

In some embodiments, as shown in FIG. 3, a color filter 152 may be disposed between the organic layer 154 and the first passivation layer 142. The color filter 152 may include a red (R) color filter, a green (G) color filter, and a blue (B) color filter. The R, G, B color filters each are formed per pixel, thus forming R, G, B pixels. The color filter 152 may be disposed so as to overlap the pixel electrode 182. The color filter 152 may include a photosensitive organic material including a pigment. The organic layer 154 is disposed on the color filter 152, so that the height difference of the R, G, B color filters may be eliminated to achieve planarization. The color filter 152 may be covered by the organic layer 154. That is, the color filter 152 may not be exposed due to coverage by the organic layer 154, although this is merely illustrative, and the present invention is not limited thereto.

The common electrode 162 may be disposed on the organic layer 154. The common electrode 162 receives a common voltage to produce an electric filed together with the pixel electrode 182, whereby the direction of alignment of liquid crystal molecules of the liquid crystal layer 300 may be controlled.

The common electrode 162 includes a first opening 162*a*-1 that exposes the area where the contact hole 136*a* is formed. As illustrated in FIG. 2, at least a part of the drain electrode 136 may be exposed by the first opening 162*a*-1. As shown in FIG. 2, the first opening 162*a*-1 of the common electrode 162 may be formed in the opening 154*a* of the organic layer 154.

The common electrode 162 may include a second opening 162*a*-2 that exposes the channel CH. As shown in FIGS. 1 and 2, the first opening 162*a*-1 and the second opening 162*a*-2 may be separately formed, i.e. formed as separate and distinct openings. More specifically, the first opening 162*a*-1 and the second opening 162*a*-2 may be spaced apart from each other along the direction of extension of the gate line 102.

When the common electrode 162 is directly disposed on the first passivation layer 142 overlapping the channel CH by the opening 154*a* of the organic layer 154, defects such as flicker or decoloring may occur, undesirably deteriorating display properties. In the present embodiment, the common electrode 162 includes the second opening 162*a*-2, and thus may not be directly disposed on the first passivation layer 142 overlapping the channel CH, thus preventing defects such as flicker or decoloring.

In some embodiments, the first opening 162*a*-1 and the second opening 162*a*-2 may be spaced apart from each other along the direction of extension of the gate line 102. Specifically, the contact hole 136*a* exposed by the first opening 162*a*-1 and the overlapping area of the channel CH exposed by the second opening 162*a*-2 may be spaced apart from each other in the direction of extension of the gate line 102. Briefly, the first opening 162*a*-1 and the second opening 162*a*-2 may both be disposed along one line.

As the resolution of the liquid crystal display device increases, the interval WD between the data lines may gradually decrease, and thus the size of a light-blocking member 192 (which will be described later) is increased, thereby increasing the loss of aperture ratio. When the contact hole 136*a* exposed by the first opening 162*a*-1 and the overlapping area of the channel CH exposed by the second opening 162*a*-2 are disposed along one line in this way, the size of the light-blocking member 192 may be reduced, thus obtaining a desired aperture ratio, as compared to when the contact hole 136*a* and the overlapping area of the channel CH are not disposed along a single line that extends, for example, parallel to gate line 102.

In some embodiments, the first opening 162*a*-1 and the second opening 162*a*-2 may have a rectangular shape when viewed from above as shown in FIGS. 1 and 2, which is merely illustrative, and the first opening 162*a*-1 may have various shapes without limitation so long as the first opening 162*a*-1 may expose the area where the contact hole 136*a* is formed. Also, the second opening 162*a*-2 may have various shapes without limitation so long as the second opening 162*a*-2 may expose the channel CH.

In some embodiments, as shown in FIGS. 1 and 2, the size of the first opening 162*a*-1 may be smaller than the size of the second opening 162*a*-2, although this is merely illustrative, and the size of the first opening 162*a*-1 may alternatively be greater than or equal to the size of the second opening 162*a*-2.

The common electrode 162 may be integrally formed over the entire pixel area defined by the gate line 102 and the data line 132, except for the first opening 162*a*-1 and the second opening 162*a*-2. The common electrode 162 may be formed of a transparent conductive material such as indium tin oxide (ITO) or indium zinc oxide (IZO), but the present invention is not limited thereto.

The second passivation layer 172 may be disposed on the common electrode 162, the organic layer 152, and the first passivation layer 142. The first passivation layer 142 and the second passivation layer 172 may include the contact hole 136*a* that exposes at least a part of the drain electrode 136. At least the part of the drain electrode 136 exposed through the contact hole 136*a* may come into contact with the pixel electrode 182. Thereby, the drain electrode 136 and the pixel electrode 182 may be electrically connected/coupled to each other. The second passivation layer 172 may be composed of an inorganic insulating material. For example, the second passivation layer 172 may include silicon nitride, silicon oxide, etc. The second passivation layer 172 is positioned between the pixel electrode 182 and the common electrode 162, so that the pixel electrode 182 and the common electrode 162 may be insulated from each other.

The pixel electrode 182 may be disposed per pixel on the second passivation layer 172. A part of the pixel electrode 182 may be disposed in the contact hole 136*a*. The part of the pixel electrode 182 disposed in the contact hole 136*a* may come into contact with the drain electrode 136 to thus be electrically connected thereto.

As illustrated in FIGS. 2 and 3, when a part of the gate insulating film 112 is exposed by the contact hole 136*a*, a part of the pixel electrode 182 may come into direct contact with the gate insulating film 112.

The pixel electrode 182 functions to produce an electric field together with the common electrode 162, so as to rotate liquid crystal molecules of the liquid crystal layer 300. The pixel electrode 182 may be formed of a transparent conductive material such as ITO or IZO, but the present invention is not limited thereto.

The pixel electrode 182 may include a plurality of cutouts or empty dissection patterns 182*a* having various shapes such as a rectangular shape, a closed-curve shape, and a fish-bone shape. FIG. 1 illustrates the dissection patterns 182*a* having a stripe pattern shape, but the present invention is not limited thereto, and the shape of the dissection patterns 182*a* may vary as desired by those skilled in the art. When a data voltage is applied to the pixel electrode 182, an electric field is formed toward the lower common electrode 162 from the pixel electrode 182.

The light-blocking member 192 may be disposed on the second passivation layer 172. The light-blocking member 192 functions to prevent light leakage. The light-blocking member 192 may be disposed in the thin film transistor area and the non-pixel area (between pixels, the gate line and data line area). The light-blocking member 192 may include a black organic polymer material including a black dye or pigment, or metal (metal oxides), such as chromium, chromium oxide, etc.

As the organic layer 154 includes the opening 154*a* for exposing at least a part of the overlapping area of the channel CH, as shown in FIG. 3, a part of the light-blocking member 192 may be disposed in the opening 154*a*.

A column spacer 194 is provided to maintain a cell gap, and may be formed on the light-blocking member 192, as shown in FIG. 3. The color spacer 194 may be formed at a position corresponding to the thin film transistor, although this is merely illustrative, and the position of the column spacer 194 is not limited thereto.

In some embodiments, the column spacer 194 may be formed of the same material as the light-blocking member 192. Furthermore, the column spacer 194 may be integrally formed with the light-blocking member 192. For example, the column spacer 194 and the light-blocking member 192 may be formed by the same patterning process using the same material, through halftone mask or slit mask photo-exposure.

Although the embodiment of FIG. 3 illustrates a light-blocking member 192 which is disposed on the second passivation layer 172, the present invention is not limited thereto, and the light-blocking member 192 may be disposed in the area corresponding to the thin film transistor area and the non-pixel area (between pixels, the gate line and data line area) on the second substrate 201. As such, the color filter 152 may be disposed on the second substrate 201. Specifically, the color filter may be disposed so as to overlap the pixel electrode in the pixel area. The color filter may extend to the light-blocking member that is positioned at the pixel boundary, and may thus partially overlap the light-blocking member.

An alignment layer (not shown) for aligning the liquid crystal layer 300 may be disposed on the pixel electrode 182, the second passivation layer 172, the light-blocking member 192, and the column spacer 194.

The liquid crystal layer 300, including liquid crystal molecules (not shown) having positive dielectric anisotropy or negative dielectric anisotropy, may be interposed between the first substrate 101 and the second substrate 201. Also, an alignment layer (not shown) may be disposed on one surface of the second substrate 201 facing the liquid crystal layer 300.

The upper end of the column spacer 194 may be in contact with the second substrate 201. The alignment layer of the first substrate 101 and/or the alignment layer of the second substrate 201 may be interposed between the column spacer 194 and the second substrate 201.

Next, a method of manufacturing the above-described liquid crystal display device 10 according to an embodiment of the present invention will be described.

FIGS. 4 to 16 are cross-sectional views illustrating a method of manufacturing a liquid crystal display device according to an embodiment of the present invention.

Figure 4:
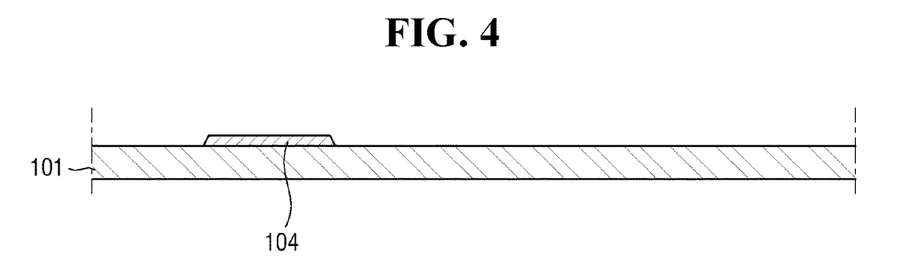
FIGS. 4 to 16 are cross-sectional views illustrating a method of manufacturing a liquid crystal display device according to an embodiment of the present invention.

First, referring to FIGS. 1, 3, and 4, a gate wiring (102, 104) is formed on a first substrate 101.

A first metal layer (not shown) is formed on the first substrate 101 which contains a transparent material such as glass and quartz. The first metal layer (not shown) may be made of aluminum, copper, silver, molybdenum, chromium, titanium, tantalum, or an alloy thereof, and may be formed of two or more layers having different physical properties. The first metal layer (not shown) may, for example, be deposited by sputtering. Subsequently, the first metal layer (not shown) is patterned by photolithography using a first exposure mask to form the gate wiring (102, 104) which includes a gate line 102 and a gate electrode 104. The gate electrode 104 may be fabricated in the form of a protrusion branching from the gate line 102.

Figure 5:
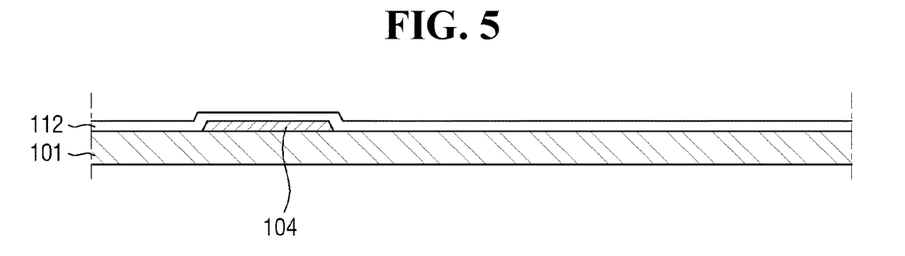

Next, referring to FIG. 5, a gate insulating film 112 is formed on the gate wiring (102, 104). The gate insulating film 112 may be formed by plasma enhanced chemical vapor deposition (PECVD), and may contain silicon oxide (SiNx) or silicon oxide ($SiO_2$).

Figure 6:
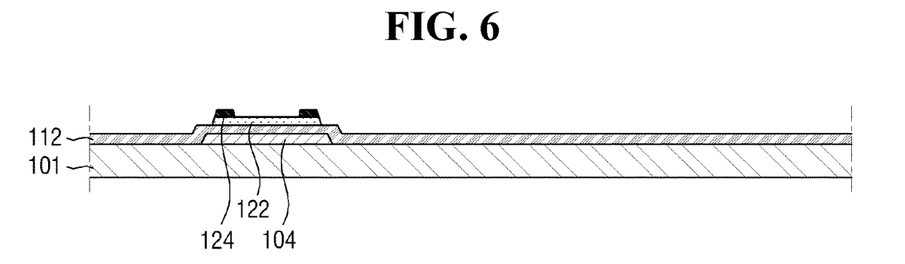

Next, referring to FIG. 6, a semiconductor layer 122 and a resistive contact layer 124 are formed on the gate insulating film 112. The semiconductor layer 122 may be formed using hydrogenated amorphous silicon or polycrystalline silicon. The semiconductor layer 122 and the resistive contact layer 124 may be formed by photolithography.

Figure 7:
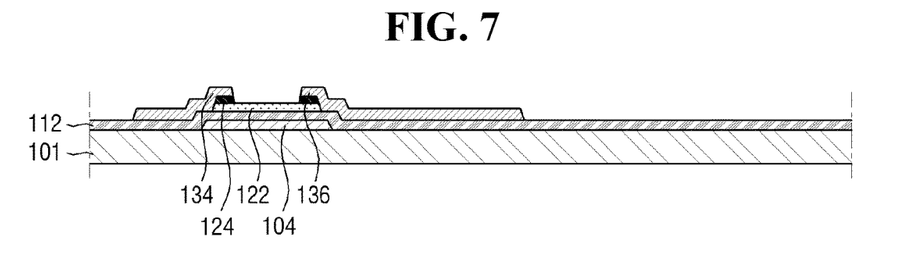

Next, referring to FIG. 7, a data wiring (132, 134, 136) is formed on the gate insulating film 112, the semiconductor layer 122, and the resistive contact layer 124 by photolithography. The data wiring (132, 134, 136) includes a data line 132 intersecting a gate line 102 to define a unit pixel, a source electrode 134, and a drain electrode 136. The data wiring (132, 134, 136), similar to the gate wiring (102, 104), may be made of aluminum, copper, silver, molybdenum, chromium, titanium, tantalum, or an alloy thereof, and may be formed of two or more layers having different physical properties.

In the present embodiment, it is illustrated that the semiconductor layer 122, the resistive contact layer 124, and the data wiring (132, 134, 136) are respectively formed by separate photolithography processes. However, the present invention is not limited thereto, and the semiconductor layer 122, the resistive contact layer 124, and the data wiring (132, 134, 136) may be formed by a photolithography process using one mask. In this case, the remnants of the semiconductor layer 122 and the resistive contact layer 124 may remain under the data line 132. In other words, the semiconductor layer 122 and the resistive contact layer 124 may be formed in a linear fashion. The semiconductor layer 122 constitutes a thin film transistor together with the gate electrode 104, the source electrode 134, and the drain electrode 136, and may form a channel.

Figure 8:
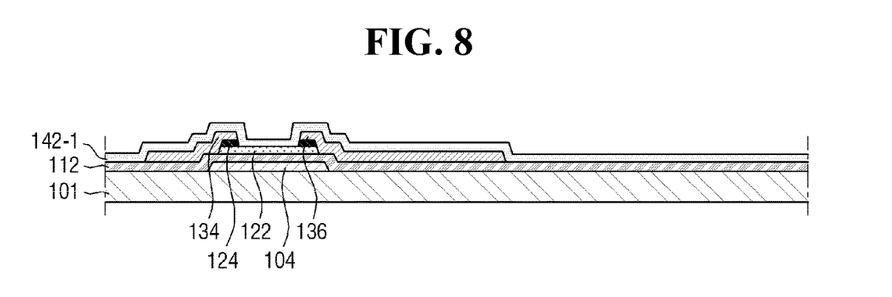

Next, referring to FIG. 8, a first protective film 142-1 is formed on the first substrate 100 and the thin film transistor. The first protective layer 142-1 may be made of an inorganic material such as silicon nitride or silicon oxide, and may be formed by plasma enhanced chemical vapor deposition (PECVD) using a material such as a-Si:C:O or a-Si:O:F.

Figure 9:
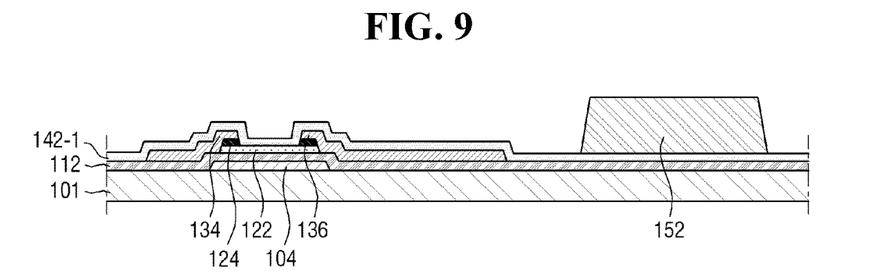

Next, referring to FIG. 9, a color filter 152 is formed on the first protective film 142-1. The color filter 152 may be disposed in the pixel area, and may include a red (R) color filter, a green (G) color filter, and/or a blue (B) color filter, although any color is contemplated. For example, the color filter 152 shown in FIG. 9 may be any one of a red (R) color filter, a green (G) color filter, and a blue (B) color filter. The color filter 152 may be made of a photosensitive organic material containing a pigment.

The color filter 152 may be formed by photolithography or ink jet printing, and may also be formed by various other methods.

Figure 10:
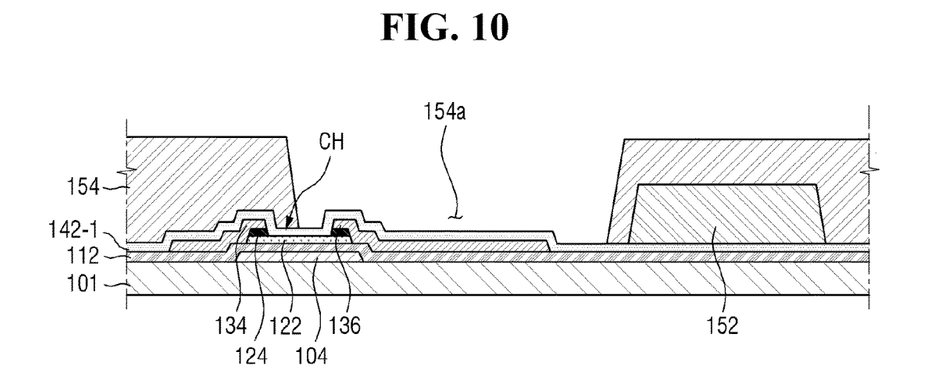

Next, referring to FIGS. 2 and 10, an organic layer is formed on the first protective film 142-1 and the color filter 152. The organic layer 154 includes an opening 154a exposing at least a part of the drain electrode 136 and at least a part of the first protective film 142-1 overlapping the channel CH. Since the interval WD between the data lines 132 gradually decreases with increase in resolution of the liquid crystal device, the opening 154a of the organic layer 154 also shrinks. However, considering the thickness of the organic layer 154, there is a limitation in decreasing this opening 154a in accordance with resolution. Thus, at least a part of the first protective film 142-1 overlapping the channel CH may be exposed by this opening 154a.

The process of forming the organic layer 154 may include the step of forming an organic film on the first protective film 142-1 and the color filter 152, and the step of patterning the organic film. The organic layer 154 offers desirable planarization characteristics, and may be made of a photosensitive material. The organic layer 154 may be formed using spin coating or slit coating, or may be formed using both spin coating and slit coating.

Figure 11:
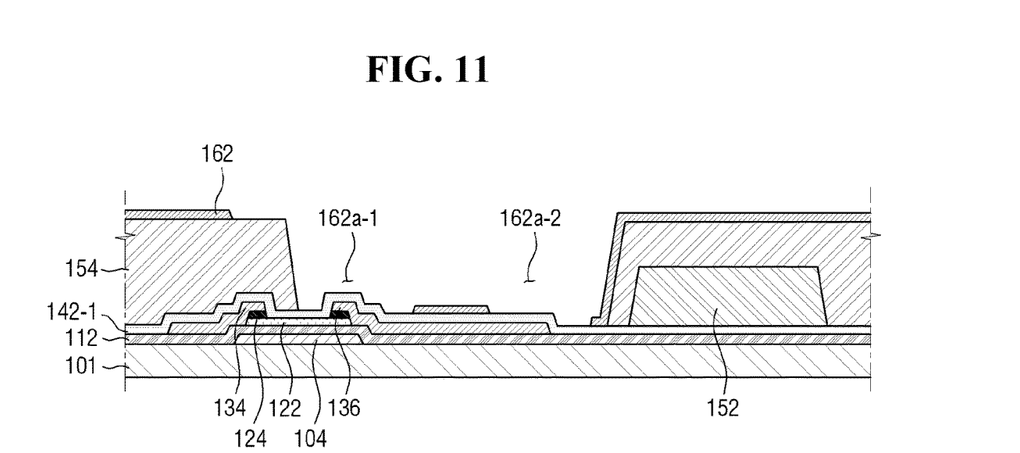

Next, referring to FIGS. 2 and 11, a common electrode 162 is formed on the organic layer 154. The common electrode 162 may include the first opening 162a-1 that exposes the area in which the contact hole 136a is formed. The common electrode 162 may include the second opening 162a-2 that exposes the overlapping area of the channel CH. The first opening 162a-1 and the second opening 162a-2, as shown in FIG. 2, may be separated from each other. The first opening 162a-1 and the second opening 162a-2 may be spaced apart from each other along the extension direction of the gate line 102.

In some embodiments, the openings of the common electrode 162 may be realized in the form of openings separated from each other, but may also be realized in the form of one opening if the area in which the contact hole 136a is formed, and the overlapping area of the channel CH, can be exposed.

When the common electrode 162 is directly formed on the portion of the first passivation layer 142 that overlaps the channel CH through the opening 154a formed in the organic layer 154, defects such as flicker or decoloring may occur, thereby deteriorating display properties. Thus, when the second opening 162a-2 is formed in the common electrode 162, the common electrode 162 may not be directly formed on that part of the first passivation layer 142 that overlaps the channel CH. Therefore, it is possible to prevent the occurrence of defects such as flicker or decoloring.

Since the common electrode 162 is formed to include the first opening 162a-1 and the second opening 162a-2, the common electrode 162 may have a bar shape vertically extending within the opening 154a of the organic layer 154, as shown in FIGS. 2 and 11.

The common electrode 162, except for the first opening 162a-1 and the second opening 162a-2, may be integrally formed over the entire pixel area surrounded by the gate lines 102 and the data lines 132. The common electrode 162 may be made of a transparent conductive material such as indium tin oxide (ITO) or indium zinc oxide (IZO), but the present invention is not limited thereto.

The first opening 162a-1 and the second opening 162a-2 may be formed to be spaced apart from each other along the extension direction of the gate line 102. In other words, the contact hole 136a exposed by the first opening 162a-1, and the overlapping area of the channel CH exposed by the second opening 162a-2, may be spaced apart from each other along the extension direction of the gate line 102. That is, the first opening 162a-1 and the second opening 162a-2 may be formed in one line.

With increase in resolution of the liquid crystal display device, the interval WD between the data lines gradually decreases, and thus the size of the light-blocking member 192 increases, so as to increase the loss of aperture ratio. As such, when the contact hole 136a exposed by the first opening 162a-1 and the overlapping area of the channel CH exposed by the second opening 162a-2 are formed along one line perpendicular to the data line 132, the size of the light-blocking member 192 can be relatively decreased compared to when the first opening 162a-1 and the second opening 162a-2 are not both formed along a line perpendicular to the data line 132, and thus aperture ratio may be improved.

Figure 12:
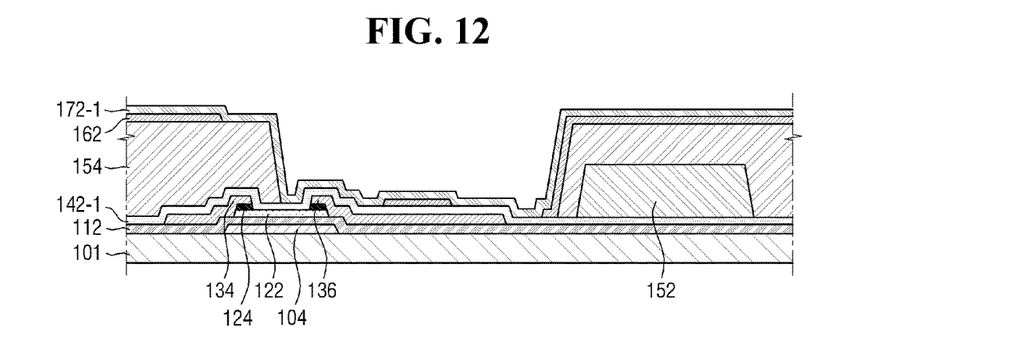

Next, referring to FIG. 12, a second protective film 172-1 is formed on the common electrode 162, the organic layer 154, and the first protective film 142-1. The process of forming the second protective film 172-1 is similar to the process of forming the first protective film 142-1. That is, the process of forming the second protective film 172-1 may include the step of depositing an inorganic insulating material, such as silicon nitride or silicon oxide, onto the common electrode 162 and the conductive layer 164 and the step of patterning the deposited inorganic insulating material to expose at least a part of the conductive layer 164.

Figure 13:
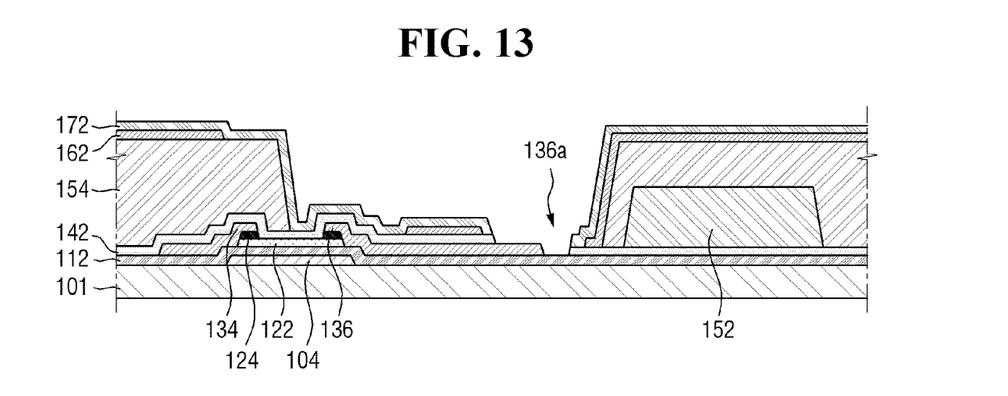

Next, referring to FIGS. 2 and 13, a contact hole 136a that exposes at least a part of the drain electrode 136 is formed in the first protective film 142-1 and the second protective film 172-1, so as to form a first passivation layer 142 and a second passivation layer 172. The process of forming the contact hole 136a may be performed by photolithography. The contact hole 136a, as shown in FIGS. 2 and 13, may be formed to expose a part of the drain electrode 136 and a part of the gate insulating film 112. However, this is illustrative, and the contact hole 136a may also be formed to expose a part of the drain electrode 136 without exposing the gate insulating film 112.

Figure 14:
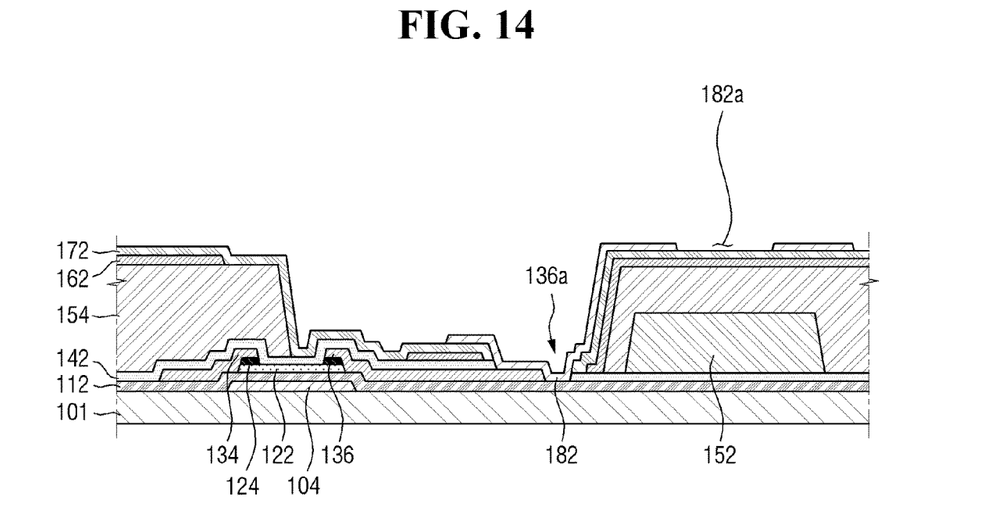

Next, referring to FIG. 14, a pixel electrode 182 is formed on the second passivation layer 172. Specifically, the pixel electrode 182 may be formed to be brought into contact with at least a part of the drain electrode 136 which is exposed through the contact hole 136a formed in the first passivation layer 142 and the second passivation layer 172. Through this contact, the pixel electrode 182 may be electrically connected with the drain electrode 136.

Figure 15:
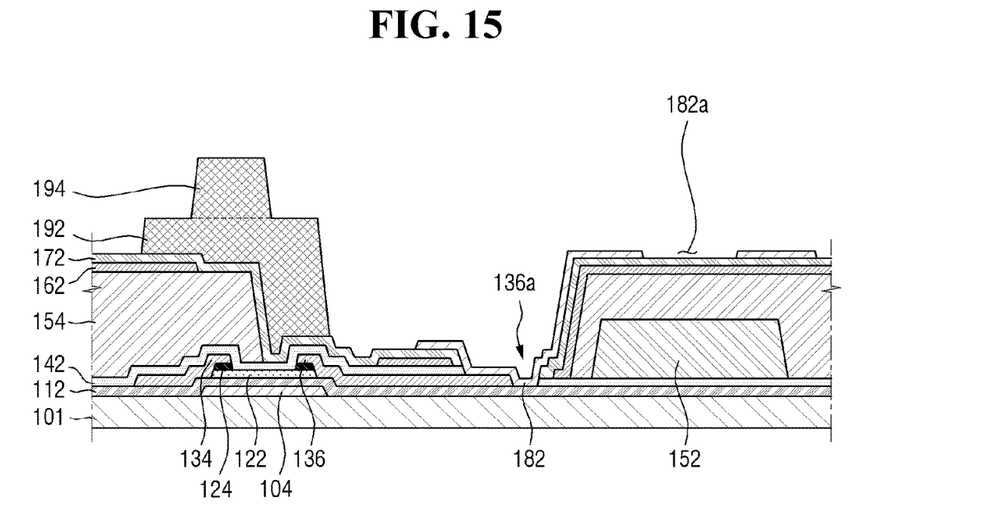

Next, referring to FIG. 15, a light-blocking member 192 is formed on the second passivation layer 172. The light-blocking member 192 may be formed in an area in which liquid crystal molecules included in the liquid crystal layer 300 do not operate, for example, a thin film transistor area or a non-pixel area (area between pixels or area between gate line and data line). The light-blocking member may be formed using a black organic polymer material containing a black dye or pigment, or a metal (metal oxide) such as chromium (chromium oxide).

Next, a column spacer 194 is formed on the light-blocking member 192. The column spacer 194, as shown in FIG. 15, may be formed integrally with the light-blocking member 192 at the same time. For example, the column spacer 194 and the light-blocking member 192 may be integrally formed by a patterning process using the same material through halftone mask exposure or slit mask exposure. However, this is illustrative only, and the present invention is not limited thereto.

The column spacer 194, as shown in FIG. 15, may be formed in an area corresponding to a thin film transistor. However, this is illustrative only, and the formation position of the column spacer 194 is not limited thereto.

Figure 16:
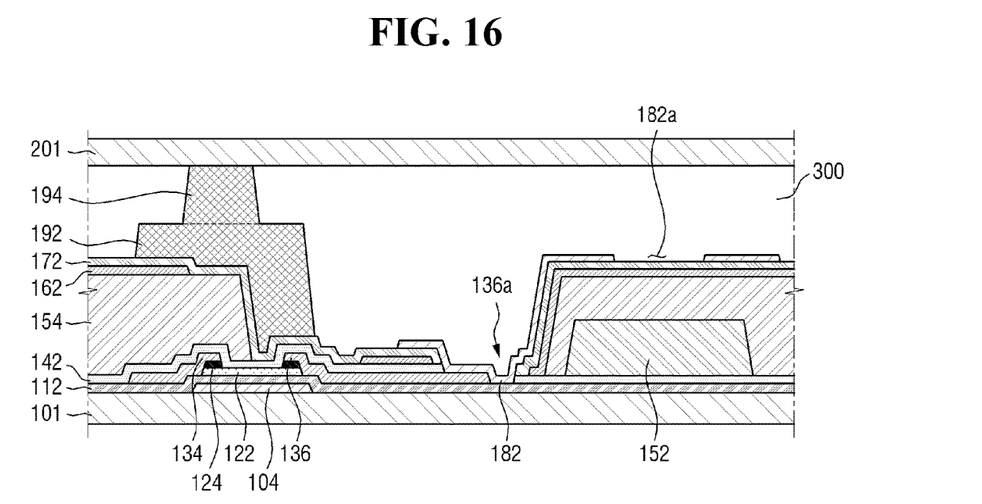

Next, referring to FIG. 16, an alignment layer (not shown) is formed on each of the first substrate 101 and the second substrate 201. Subsequently, liquid crystal molecules (not shown) having positive dielectric anisotropy or negative dielectric anisotropy are applied to the first substrate 101 so as to form a liquid crystal layer 300. Subsequently, the first substrate 101 provided with the liquid crystal layer 300 is coupled with the second substrate 201.

Hereinafter, a liquid crystal display device according to another embodiment of the present invention will be described.

Figure 17:
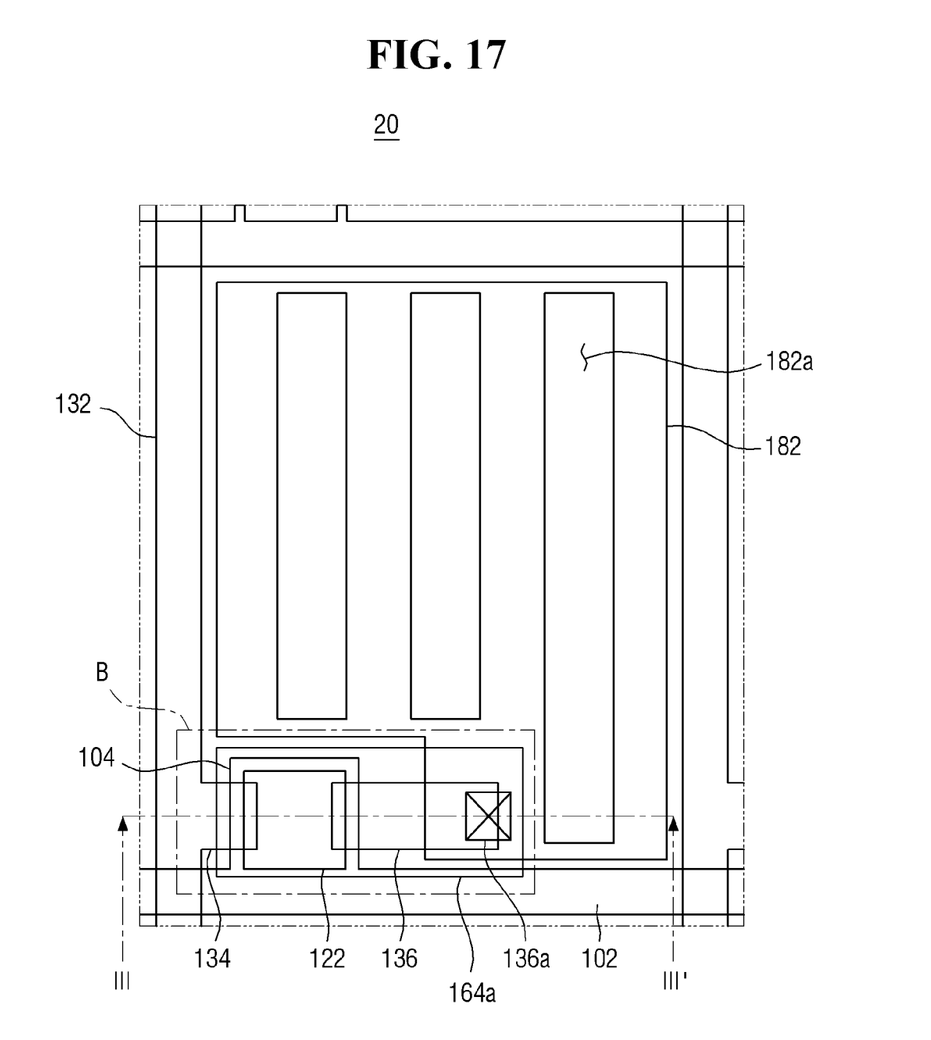
FIG. 17 is layout view of a liquid crystal display device according to another embodiment of the present invention.
Figure 18:
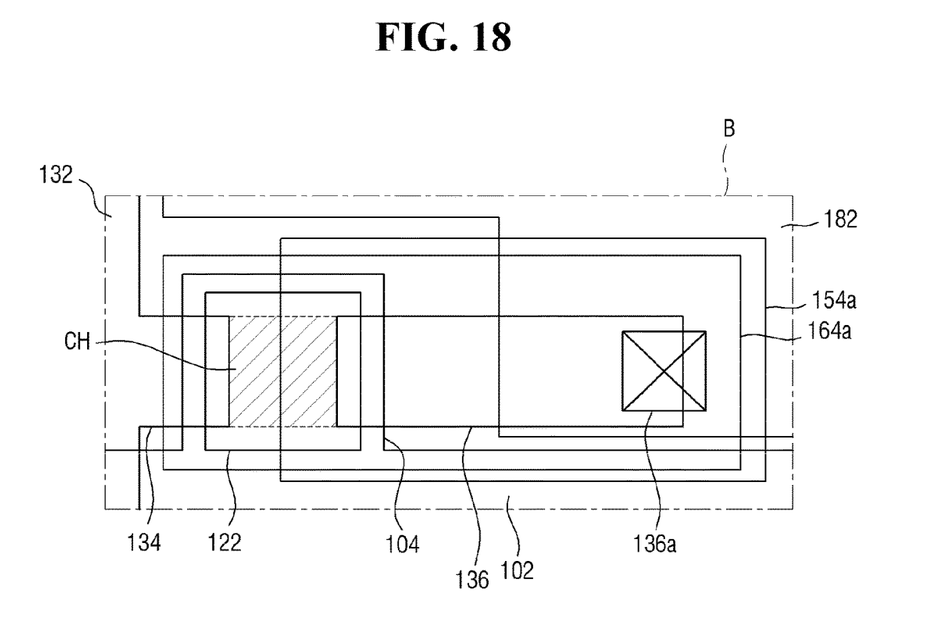
FIG. 18 is an enlarged view of Region B of FIG. 17.
Figure 19:
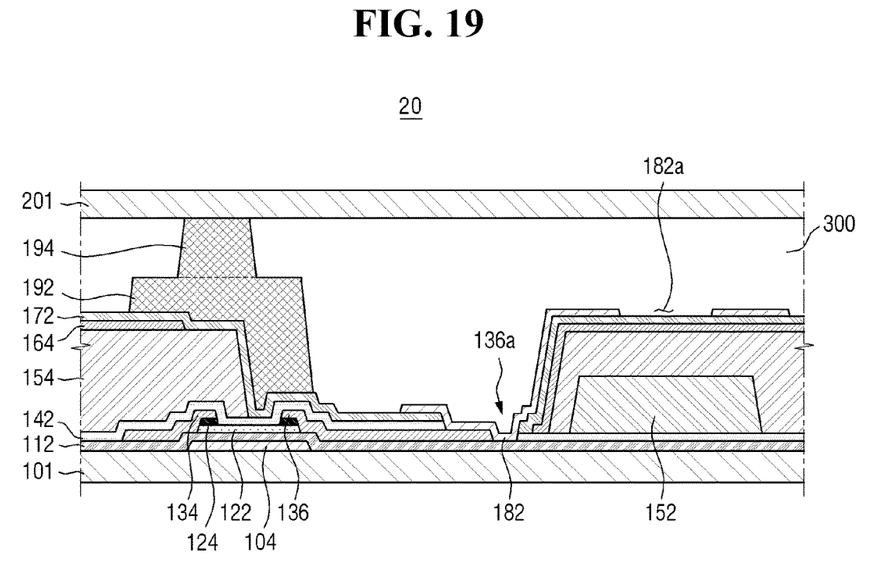
FIG. 19 is a cross-sectional view taken along the line III-III' of FIG. 18.

FIG. 17 is layout view of a liquid crystal display device according to another embodiment of the present invention. FIG. 18 is an enlarged view of Region B of FIG. 17. Specifically, FIG. 18 is a view for explaining the positional relation between an organic layer 154 and a common electrode 164. FIG. 19 is a cross-sectional view taken along the line III-III' of FIG. 18.

The liquid crystal display device 20 according to another embodiment of the present invention is the same as or similar to the liquid crystal display 10 described with reference to FIGS. 1 to 3, except that the configuration of the common electrode 164 is different. Hereinafter, the differences therebetween will be mainly described.

Referring to FIGS. 17 to 19, in the present embodiment, the common electrode 164 includes an opening 164a that exposes the area in which the contract hole 136a is formed, and the area of potential overlap with the channel CH. As shown in FIG. 18, the entire drain electrode 136 can be exposed by the opening 164a. This opening 164a, as shown in FIG. 18, may be formed along the extension direction of the gate line 102.

The area in which the contract hole 136a is formed, and the area of potential overlap with the channel CH, can be exposed by this one opening 164a.

When the common electrode 164 is directly disposed on the first passivation layer 142 overlapping the channel CH by the opening 154a formed in the organic layer 154, defects such as flicker or decoloring occur, so as to deteriorate display properties. In the present embodiment, since the common electrode 164 includes the opening 164a exposing the area of potential overlap with the channel CH, the common electrode may not be directly disposed on the first passivation layer 142 overlapping the channel CH, and thus it is possible to prevent the occurrence of defects such as flicker or decoloring.

As described above, according to embodiments of the present invention, a liquid crystal display device can realize high resolution, without deterioration of display properties due to defects such as flicker or decoloring.

The effects of the present invention are not limited by the foregoing, and other various effects are anticipated herein.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Various features of the above described and other embodiments can be mixed and matched in any manner, to produce further embodiments consistent with the invention.

What is claimed is:

1. A liquid crystal display device, comprising:
   a first substrate and a second substrate facing each other;
   a liquid crystal layer disposed between the first substrate and the second substrate;
   a semiconductor layer disposed on the first substrate and including upon which a source electrode and a drain electrode are spaced apart from each other while facing each other;
   an organic layer disposed on the channel and including an opening that exposes at least a part of the channel area; and
   a common electrode disposed on the organic layer and including a first opening that extends across the channel area and a second opening that exposes at least a part of the drain electrode,
   wherein the first opening partially overlaps with the opening of the organic layer and the second opening completely overlaps with the opening of the organic layer.

2. The liquid crystal display device of claim 1,
   wherein the opening of the organic layer includes a boundary that crosses the channel area.

3. The liquid crystal display device of claim 1, further comprising: a gate line and a data line disposed on the first substrate and arranged to intersect each other so as to define a pixel area,
   wherein the first opening and the second opening of the common electrode are spaced apart from each other along a direction of extension of the gate line.

4. The liquid crystal display device of claim 3,
   wherein the organic layer is disposed on the gate line, and the opening of the organic layer extends over at least a part of the gate line.

5. The liquid crystal display device of claim 1,
   wherein the first opening of the common electrode extends over the entire drain area.

6. The liquid crystal display device of claim 5, further comprising: a gate line and a data line disposed on the first substrate and arranged to intersect each other to define a pixel area,
   wherein the first opening of the common electrode is oriented substantially parallel to the gate line.

7. The liquid crystal display device of claim 6,
   wherein the organic layer is disposed on the gate line, and the opening of the organic layer extends over at least a part of the gate line.

8. The liquid crystal display device of claim 1, further comprising: a first passivation layer disposed on the semiconductor layer and a second passivation layer disposed on the common electrode,
   wherein the first passivation layer and the second passivation layer collectively include a contact hole that exposes at least a part of the drain electrode.

9. The liquid crystal display device of claim 8, further comprising: a light-blocking member disposed on the second passivation layer,
   wherein a part of the light-blocking member is disposed in the opening of the organic layer.

10. A method of manufacturing a liquid crystal display device, the method comprising:
    forming a semiconductor layer on a first substrate, the semiconductor layer including a channel area upon which a source electrode and a drain electrode are spaced apart from each other while facing each other;

forming an organic layer on the channel, the organic layer including an opening that exposes at least a part of the channel area; and forming a common electrode on the organic layer, the common electrode including a first opening that extends across the channel area and a second opening that exposes at least a part of the drain electrode, wherein the first opening partially overlaps with the opening of the organic layer and the second opening completely overlaps with the opening of the organic layer.

11. The method of claim 10,
wherein the opening of the organic layer includes a boundary that crosses the channel area.

12. The method of claim 10, further comprising: forming a gate line and a data line on the first substrate, the gate line and the data line being arranged to intersect each other so as to define a pixel area,
wherein the first opening and the second opening of the common electrode are spaced apart from each other along a direction of extension of the gate line.

13. The method of claim 10,
wherein the first opening of the common electrode extends over the entire drain electrode.

14. The method of claim 13, further comprising: forming a gate line and a data line on the first substrate, the gate line and the data line being arranged to intersect each other to define a pixel area,
wherein the first opening of the common electrode is oriented substantially parallel to the gate line.

15. The method of claim 10, further comprising:
forming a first passivation layer between the semiconductor layer and the organic layer;
forming a second passivation layer on the common electrode; and
forming a contact hole in the first passivation layer and the second passivation layer, the contact hole exposing at least a part of the drain electrode.

16. The method of claim 15,
wherein the forming a contact hole is performed by one photolithography process.

17. The method of claim 15, further comprising: forming a color filter between the first passivation layer and the organic layer.

18. The method of claim 15, further comprising: forming a light-blocking member on the second passivation layer,
wherein a part of the light-blocking member is formed in the opening of the organic layer.

* * * * *